INVENTOR.
Marcel R. Sommeria
BY Mueller and Aichele
Attys.

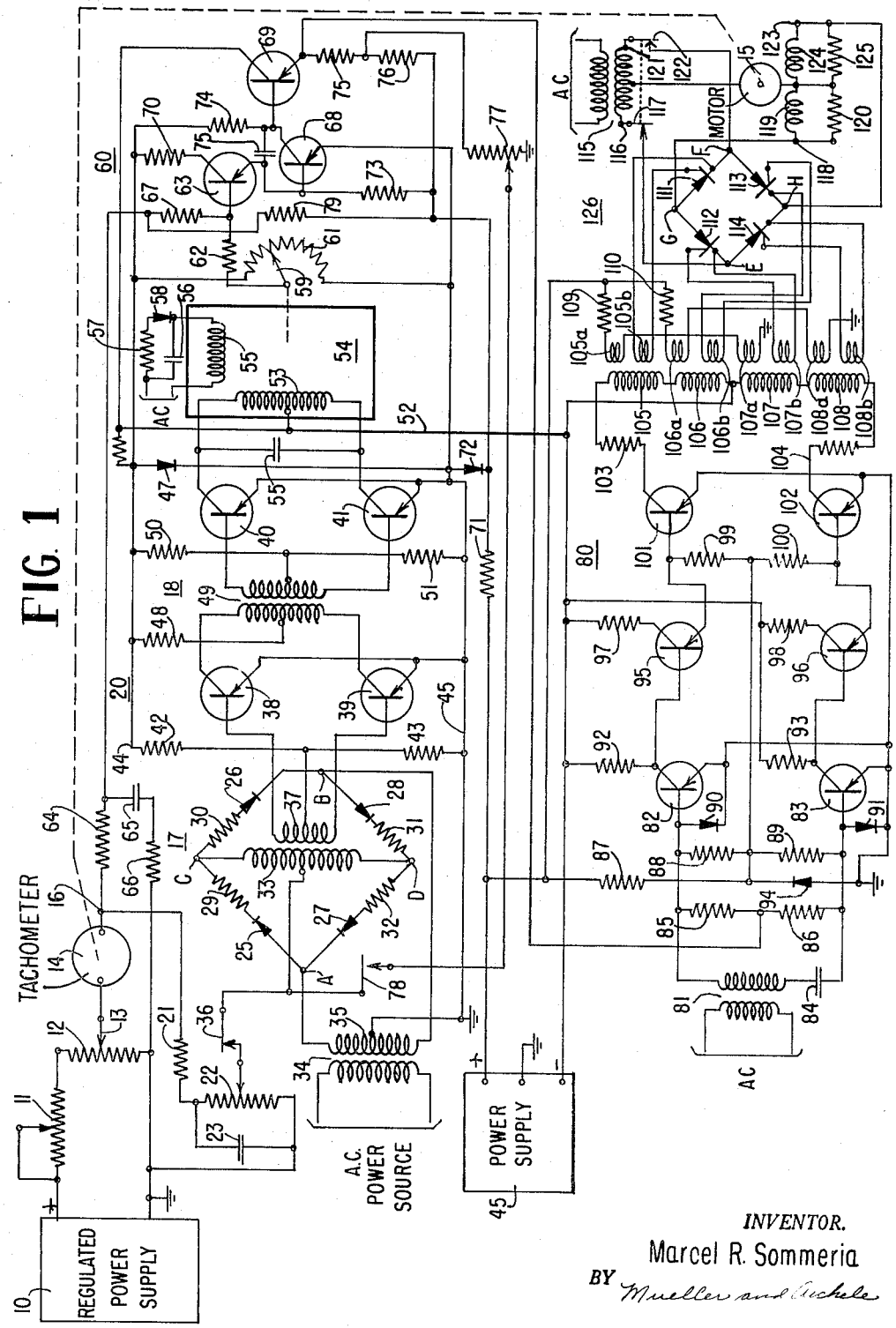

Feb. 22, 1966   M. R. SOMMERIA   3,237,075
MOTOR SPEED CONTROL SYSTEM
Filed May 4, 1962   3 Sheets-Sheet 3
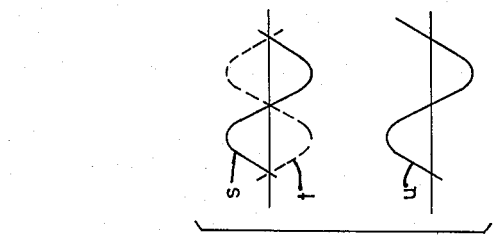
FIG. 8
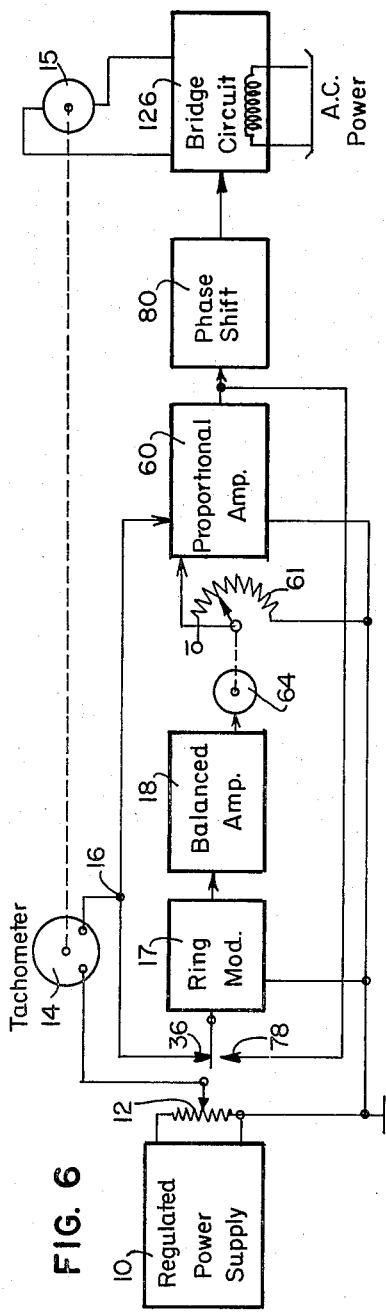
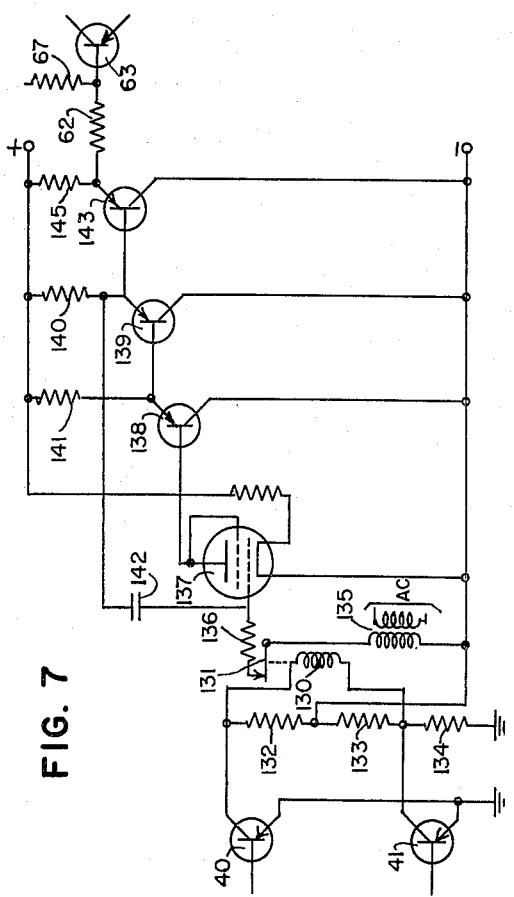
Inventor
Marcel R. Sommeria
By Mueller and Aichele
Attys.

United States Patent Office 3,237,075
Patented Feb. 22, 1966

3,237,075
MOTOR SPEED CONTROL SYSTEM
Marcel R. Sommeria, Palos Heights, Ill., assignor to Welding Research, Inc., Chicago, Ill., a corporation of Illinois
Filed May 4, 1962, Ser. No. 193,077
20 Claims. (Cl. 318—327)

This invention relates generally to rectifier control systems, and more particularly to a system for controlling the direct current applied to a device to cause operation thereof in accordance with a reference.

Control systems for controlling the direct current power delivered to various devices are useful in many applications, such as for control of direct current motors. Such systems may control the direct current power applied to the device by controlling the conductivity of rectifiers which supply such power from an alternating current source. Although systems are available which are suitable for controlling direct current devices in particular applications, relatively simple systems have not been available which are suitable for general application. Further, many such systems are not able to provide complete correspondence between the actual operation and the desired reference, and a residual error remains.

It is therefore an object of the present invention to provide an improved rectifier control system which is suitable for general application and which provides complete control of the direct current power applied to a device.

A further object is to provide a motor control system for applying current to a direct current motor which controls the speed of the motor so that it corresponds exactly with a preset reference potential.

Another object of the invention is to provide an automatic control system for supplying energizing current which compensates for certain tolerances to render the system less critical, and which provides highly accurate and reliable operation.

A feature of the invention is the provision of a rectifier control circuit including a slow acting control supplemented by a fast acting control which together operate through a phase shift circuit to control the conduction of rectifiers to completely control the direct current supplied to a device.

Another feature of the invention is the provision of a system operating from an error voltage which corresponds to the difference between the actual operation of a device and the desired operation, wherein the error voltage is applied to a ring modulator to produce an alternating current voltage which controls a servo system for providing a control voltage, which in turn operates through a balanced phase shift circuit to produce pulses controlling silicon controlled rectifiers to control the energy supplied to the controlled device. The servo system may include a servo motor or an electronic amplifier which produces a direct current voltage representing the phase and amplitude of the attenuating current voltage.

A further feature of the invention is the provision of a motor control circuit in which a reference voltage may be set to provide any speed for the motor throughout its full operating range, with this voltage being compared with a voltage corresponding to the actual speed of the motor to provide an error voltage which operates through a servo system and a phase shift circuit to control the conductivity of rectifiers for energizing the motor.

A still further feature of the invention is the provision of a control system including only semiconductor amplifier and rectifier devices, and which include a servo motor control which compensates for errors in other parts of the system so that highly accurate and reliable operation takes place.

Still another feature of the invention is the provision of a phase shift circuit having two branches including transistors which normally conduct during alternate half cycles of an alternating current wave applied thereto, with a control amplifier applying current to the branches to cause the transistors to conduct during more or less than half cycles. This produces pulses in transformers when conduction starts and stops the spacing of which varies with the control current, and the pulses are applied to rectifiers in a bridge circuit to control the conductivity thereof and thereby control the power applied to a device.

A further feature of the invention is the provision of an electronic servo system including a chopper which applies a portion of a wave to an operational amplifier depending on the phase of the wave exciting the chopper, with the amplifier having a capacitive feedback current which holds the same at an initial condition and applies increments of current to a load to establish a control voltage thereacross which increases or decreases with the phase of the wave exciting the chopper. The amplifier may include a tube having a high grid resistance and the load may be coupled to the plate of the tube through transistor stages to provide a low impedance output for the amplifier.

The invention is illustrated in the accompanying drawings wherein:

FIG. 1 is a circuit diagram of the control circuit of the invention;

FIG. 6 is a block diagram of the system illustrated in FIG. 1;

FIG. 7 is a circuit diagram of an alternate circuit to replace the servo motor in the system of FIG. 1; and FIG. 8 includes curves illustrating the operation of the circuit of FIG. 7.

Figure 4:
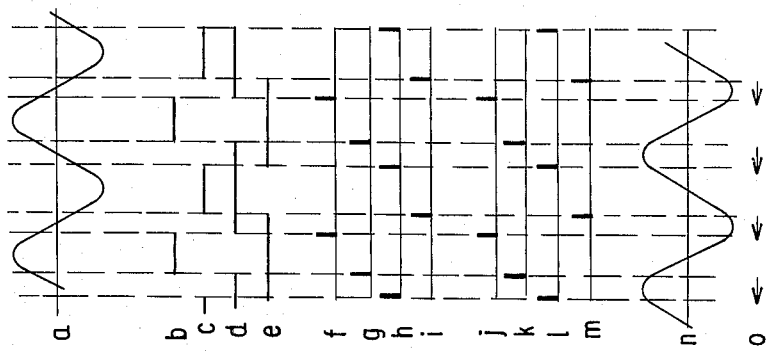
FIGS. 3 and 4 are curves showing the correction provided by the system of FIG. 1.

In practicing the invention there is provided a rectifier control circuit for a device such as a direct current motor. A reference voltage for establishing the desired operation is provided as by a potentiometer connected to a regulated power supply. A voltage is obtained from a meter which may be a tachometer coupled to the motor, and this is compared to the reference voltage to provide an error voltage. The two voltages may be of opposite polarity and added in series so that the output will be either plus or minus depending upon whether the speed of the motor is greater or less than that desired. The error voltage is applied through a ring modulator which converts the direct current voltage to an alternating current signal which may be of opposite phases depending on the polarity of the error voltage. The alternating current signal is amplified and applied to a servo system which provides a voltage which varies with the error voltage. The servo system may include a servo motor which controls the movable arm on a potentiometer to provide a control voltage which becomes greater or less depending upon the operation of the servo motor. The control voltage from the potentiometer is combined with the original error voltage and applied to an amplifier which has a center setting and which conducts more or less, depending upon the error and its direction. The amplifier is coupled to a balanced system and applies current thereto to control the duration of conduction in two balanced circuits of the system. These are switch type transistor circuits which apply current to transformers so that pulses are developed when the current starts and stops. The pulses of positive polarity are used to control the conductivity of silicon controlled rectifiers connected in a bridge which supplies current from an alternating current source to the direct current motor. By causing the two balanced branches of the control circuit to conduct more or less than half a cycle, the timing of the pulses is similarly controlled so that more or less current is applied to the motor through the bridge. The timing of the pulses may change the order of conduction to thereby change the direction of current to provide reverse rotation. The servo motor acts to provide zero error and any tolerances in the amplifiers and phase shift circuits may also be corrected thereby. The direct control by the error voltage to supplement the servo motor control provides faster control to thereby improve the operation of the system.

The servo system may be in the form of an operational amplifier excited by a chopper which applies voltages thereto having polarities depending on the polarity of the error voltage. The amplifier provides a direct current voltage which changes relatively slowly with the error voltage and operates to provide zero error as set forth above.

Referring now to the drawings, FIG. 1 shows the complete circuit diagram and FIGS. 2 to 5 illustrate the operation of the system. FIG. 6 is a block diagram of the system, and the system will be described first in connection with this block diagram. A potential from the regulated power supply 10 is derived by potentiometer 12 and forms the reference voltage for the system. The movable arm on potentiometer 12 is connected in series with the output of tachometer 14 to the terminal 16. The reference voltage is therefore combined with the tachometer voltage to provide an error voltage at terminal 16.

The error voltage at terminal 16 is applied to two paths, the first extending through contact 36 to ring modulator 17. The ring modulator converts the direct current error voltage to an alternating current signal, with the alternating current signal being of opposite phases in accordance with the polarity of the error voltage. The alternating current signal is applied through balanced amplifier 18 to servo motor 54 which controls the movable arm on potentiometer 61. The potentiometer 61 applies a D.C. potential to the proportional amplifier, which is combined in the proportional amplifier with the original error voltage from terminal 16.

The proportional amplifier is coupled to a balanced phase shift circuit 80, with the current applied by the proportional amplifier controlling the duration of conduction in the two balanced branches of the circuit. Pulses from the phase shift circuit 80 are applied to the silicon controlled rectifiers in bridge circuit 126 to control the current supplied to the motor 15. By causing the two balanced branches in the circuit 80 to conduct more or less than half a cycle, the timing of the pulses applied to the bridge rectifier circuit are controlled to thereby apply more or less current to the motor. Timing of the pulses may actually change the direction of current flow to the motor to provide rotation in the opposite direction.

The servo motor 54 counteracts the error signal and also corrects for any tolerances in the amplifier and phase shift circuits. The direct control by the error voltage applied from terminal 16 to the proportional amplifier 60 provides fast control of the system. During steady state operation, the input to the ring modulator may be switched from contact 36 to contact 78. This applies the output of the proportional amplifier to the ring modulator to hold the system at center or "at rest" position in condition for the speed control operation.

For a more detailed consideration of the system reference is made to the complete circuit diagram of FIG. 1. The same numerals are used in FIGS. 1 and 6 for corresponding parts.

A highly stable direct current potential is provided by a regulated power supply 10. A speed setting potentiometer 12 is coupled to the regulated power supply by a variable resistor 11 which can be used for calibration. The adjustment of the movable contact 13 on the potentiometer 12 controls the speed of the motor by providing a direct current potential which forms the reference for the motor speed. Connected in series with the movable contact 13 is the electrical output of tachometer 14 which is mechanically coupled to the controlled motor 15. The direct current output of the tachometer is of opposite polarity to that at contact 13 and the potential at contact 13 is balanced against the direct current voltage produced by tachometer 14 to provide an error voltage at terminal 16. The system of the invention acts to reduce the error voltage to zero so that the speed of the motor at any instant will be that which corresponds to the voltage appearing at movable contact 13.

The error voltage at point 16 is applied through two paths, the first being to the servo system 20, and the second to the proportional control system 60. In servo system the error voltage is applied through resistor 21 to potentiometer 22 which is bridged by capacitor 23. This makes it possible to select a desired input level to the servo system. The direct current error voltage is converted to an alternating current signal by ring modulator 17 including the diodes 25, 26, 27 and 28. This ring modulator operates as an electronic chopper which provides an alternating current signal having an amplitude corresponding to the amplitude of the direct current voltage applied. The diodes are connected in series with resistors 29, 30, 31 and 32 to form a bridge. The direct current error voltage is applied to the center tap of winding 33 connected across one diagonal of the bridge. An alternating current voltage is applied through transformer 34 and from the secondary winding 35 thereof across the other diagonal of the bridge. The secondary winding 35 has a grounded center tap so that the error voltage is effectively applied between the center tap of winding 33 and the center tap of the secondary winding 35. The direct current error voltage is applied to the winding 33 through switch 36 which is closed when the system is operating to provide control of the motor. As will be further explained, a voltage may be applied to the bridge from the amplifier 60 during standby operation of the system.

Considering now the operation of the ring modulator, when the alternating current fom the secondary winding 35 is of a polarity to cause point A to be positive, current will flow through rectifier 25, resistor 29, resistor 30 and rectifier 26 back to the other end of the secondary winding 35. Similarly, when the alternating current is of opposite polarity, point B of the bridge becomes positive and current will flow through rectifier 28, resistor 31, resistor 32 and rectifier 27 back to the winding 35. The rectifiers may be considered as switches which are closed when the alternating current causes them to conduct, and which are open when the current is flowing in the opposite direction. Accordingly, it will be seen that when the potential at point A is positive and rectifiers 25 and 26 conduct, the error voltage will be placed across the top half of winding 33, with the path being completed through resistor 29 and rectifier 25 and the top of winding 35 to the center tap thereof, and through resistor 30 and rectifier 26 through the bottom of winding 35 to the center tap thereof. Similarly, when the potential at point B is positive and rectifiers 27 and 28 conduct, the error voltage will be placed across the bottom of winding 33 to the grounded center tap of winding 35. This voltage across winding 33 will induce a voltage across the secondary winding 37 which is essentially a square wave at low error voltages at which the circuit operates. This wave is distorted at higher error voltage but this is of no significance. When there is no error voltage applied to the center tap of winding 33, there is no potential difference developed between points C and D of the bridge. The error voltage may be of either polarity and when the polarity of the error changes the output wave will also reverse in phase.

The output of the ring modulator 17 is derived by secondary winding 37 coupled to the winding 33 and applied to a balanced amplifier 18 including a first pair of balanced stages including transistors 38 and 39 and a second pair of balanced stages including transistors 40 and 41. The center tap of the winding 37 is established at a reference potential by resistors 42 and 43 which are connected between conductor 44 and conductor 45 which is at ground potential. The conductor 44 is held at a negative potential derived from the unregulated power supply 45, but this negative potential is regulated by resistor 46 and Zener diode 47. The potential from conductor 44 is applied through resistor 48 to the center tap of the primary winding of transformer 49 and to the collector electrodes of transistors 38 and 39 to provide operating bias therefor. The output of transistors 38 and 39 is applied to transistors 40 and 41 by transformer 49. A reference potential is applied through resistors 50 and 51 to the secondary of transformer 49 which is connected to the base electrodes of transistors 40 and 41. The unregulated negative potential from power supply 45 is applied through conductor 52 to the center tap of the control winding 53 of the servo motor 54 and to the collector electrodes of transistors 40 and 41 to provide operating bias.

The servo motor 54 is operated by the signal applied to the control winding 55. This winding is tuned by capacitor 55 in order to provide a proper alternating current wave for operating the servo motor. The servo motor has a reference or fixed phase winding 55 which is connected to the A.C. voltage source through capacitor 56, resistor 57 and rectifier 58. The A.C. voltage is caused to lag by approximately 90° by action of capacitor 56. Resistor 57 and rectifier 58 provide some direct current into the fixed phase winding of the servo motor to damp the same. The servo motor operates the movable arm 59 of potentiometer 61 to provide a reference voltage for the proportional amplifier 60.

The square wave from the ring modulator is first amplified by the balanced stages including transistors 38 and 39 and then further amplified by the stages including transistors 40 and 41. The transistors 40 and 41 apply the amplified square wave to the control winding 53 of the servo motor, with the capacitor 55 tuning the control winding so that the square wave is converted to a substantially sinusoidal alternating current wave. The phase of this wave will change with the polarity of the error voltage. As previously stated, the signal applied to the fixed phase winding 55 is caused to lag by approximately 90° so that the output of the amplifier applied to the winding 53 will either lead or lag the voltage across the fixed phase winding by approximately 90°, depending upon the polarity of the error voltage. This will cause the servo motor to change the position of the movable contact 59 of potentiometer 61.

The proportional amplifier 60 is operated by the error voltage from point 16, as previously stated, and also by the control voltage from potentiometer 61. The servo motor 54 controls the movable arm 59 of potentiometer 61 which provides the control voltage. Potentiometer 61 is connected between conductor 44, which applies a regulated negative potential, and ground provided by conductor 45. Accordingly, a voltage depending upon the position of movable arm 59 will be applied from the movable tap 59 through resistor 62 to the base electrode of transistor 63.

The error voltage at point 16 is applied to the amplifier 60 through an equalizer network to reduce the effect of the error voltage as the frequency increases. The equalizer network includes resistor 64, capacitor 65 and resistor 66. The error voltage is applied from the equalizer network through resistor 67 to the base of transistor 63. Accordingly, the input to transistor 63 includes both the error voltage and the control voltage established by action of the servo motor 54 and potentiometer 61.

The proportional amplifier 60 is a direct current amplifier and in addition to transistor 63, which forms the input stage, includes transistors 68 and 69. The collector electrode of transistor 63 is connected through resistor 70 to conductor 44 which provides the regulated negative potential. A regulated small positive potential is provided from the power supply 45 by action of resistors 71 and Zener diode 72. This potential is applied through resistor 73 to bias the emitter electrode of transistor 68. The positive bias is also applied through resistor 79 and resistor 67 to the base of transistor 63 to improve its hold-off characteristics.

The signal and bias at the emitter electrode of transistor 63 is applied to the base electrode of transistor 68. The emitter electrode of transistor 68 is connected to ground potential, and the collector electrode is connected to the negative conductor 44 through resistor 74. Capacitor 75 connected between the base and collector electrodes of transistor 68 acts to limit the amplification of the direct current amplifier on transients. This condenser will charge through the potential difference between the base and collector electrodes, and there will be no gain in transistor 68 until the condenser is charged to the voltage of the transient. Therefore there will be no amplification of transients in this transistor since the transient will pass before the capacitor 75 can charge.

Transistor 69 forms the output stage of the D.C. amplifier and the output from the collector electrode of transistor 68 is applied to the base electrode of transistor 69. The collector electrode of transistor 69 is connected to the unregulated negative potential on conductor 52 and the emitter electrode is connected to the small positive bias through resistors 75 and 76.

In the center or "at rest" position of the system, transistor 68 will be conducting at its midpoint. This may be set by setting the center position of arm 59 of potentiometer 61 which provides the control voltage for transistor 63. As the potential from potentiometer changes, and when a potential is applied through the equalizer network to transistor 63, the transistor 68 will be driven to conduct more or less. This will change the conduction of transistor 69 which is coupled to the phase shift amplifier 80 as will be described.

The potential at the junction between resistors 75 and 76 is applied to potentiometer 77, the movable contact of which is connected through switch 78 to the center point of winding 33 in the ring modulator. Accordingly, when switch 36 is open to remove the error voltage from the ring modulator, the switch 78 may be closed to provide a voltage from the direct current amplifier thereto. This voltage is applied to the ring modulator to provide a wave for the control winding 53 of servo motor 54 to control the setting of the potentiometer 61. The values of resistors 75 and 76 are selected so that the voltage at the junction between these resistors is zero when the transistor 68 is at the midpoint in its level of conduction. Thus, there will be no voltage fed back to the ring modulator to cause operation of the servo motor 54. The potentiometer 77 can be set to provide the voltage required to hold the system at the center or "at rest" position. This makes it possible to hold the system in condition for operation before it is actually utilized to control the speed of the motor.

The phase shift circuit 80 is a switching circuit which controls the phase of pulses applied to controlled rectifiers which energize the motor. The phase shift circuit is a balanced circuit with each branch including three transistors. Alternating current signals are applied through transformer 81 to the base electrodes of transistors 82 and 83. The secondary of transformer 81 serves as a choke and a capacitor 84 is connected in series therewith so that the alternating current wave applied to transistors 82 and 83 is a sine wave. The control current is applied from the emitter of transistor 69 of amplifier 60 to the junction of resistors 85 and 86 which are in turn connected to the base electrodes of transistors 82 and 83. Positive bias potentials are also applied to the base electrodes of transistors 82 and 83 through resistors 88 and 89 to which a regulated potential is applied by resistor 87 and Zener diode 94. The emitter electrodes of transistors 82 and 83 are connected together and to ground. The collector electrode of transistor 82 is connected to the minus potential source through resistor 92 and the collector of transistor 83 is connected to the same source through resistor 93.

A diode 90 is connected between the base and emitter electrodes of transistor 82 to provide a conducting path for signals of the opposite polarity to those conducted through the base-emitter path of the transistor. Similarly, diode 91 is connected between the base and emitter electrodes of transistor 83 to provide a path for opposite polarity signals. As the emitter electrodes of transistors 82 and 83 are connected together, a complete closed circuit is provided for the alternating current from transformer 81, with alternate half-cycles rendering the transistors 82 and 83 conductive in sequence. This closed circuit is completed by diode 90 or diode 91 when the associated transistor is non-conducting as previously described. The wave applied to transistors 82 and 83 by transformer 81 and capacitor 84 has a steep slope so that the transistors are switched on and off substantially instantaneously and each will normally conduct during one-half of each cycle.

The transistors 82 and 83 are coupled to transistors 95 and 96 respectively. The collector electrode of transistor 95 is connected to the negative potential through resistor 97 and the collector electrode of transistor 96 is connected to negative potential through resistor 98. The positive potential developed across Zener diode 94 is applied through resistors 99 and 100 respectively to the emitter electrodes of transistors 95 and 96 and to the base electrodes of transistors 101 and 102 which are directly connected to the emitter electrodes of transistors 95 and 96. The emitter electrodes of transistors 101 and 102 are connected at ground potential. The collector electrodes are connected to resistors 103 and 104 which are connected in series respectively with the primary windings of the pulse transformers 105 and 106 and 107 and 108 to the negative potential from power supply 45. The pulse transformers include bias windings 105a, 106a, 107a and 108a which are connected between the positive potential and ground, with the windings 105a and 107a being connected in series with resistor 109, and the windings 106a and 108a being connected in series with resistor 110. The output windings 105b, 106b, 107b and 108b of the pulse transformers are connected to controlled rectifiers in a bridge circuit 126 as will be explained.

Figure 2:
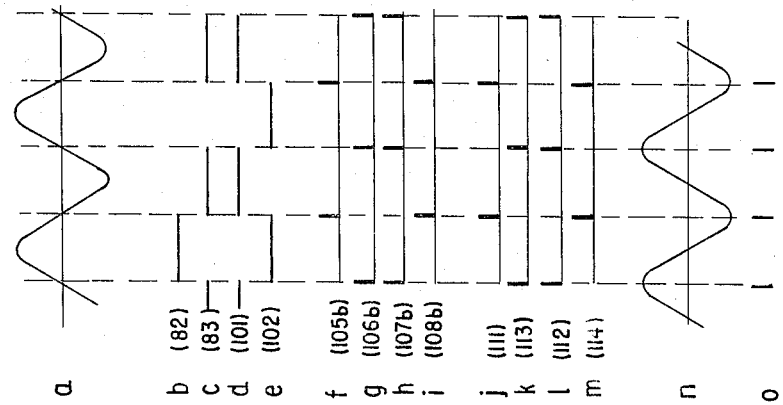
FIG. 2 is a set of curves illustrating the operation of the system of FIG. 1.

Considering now the operation of the phase shift circuit, under the condition that there is no error, the amplifier 60 is supplying 50% of its full output (transistor 69 conducting at midpoint), and transistors 82 and 83 will be conducting during alternate half cycles as previously stated. This action is illustrated in FIG. 2 where curve a shows the current applied from transformer 81 to the transistors 82 and 83. Line b shows the period during which transistor 82 is conducting, and line c shows the periods during which transistor 83 is conducting. Transistors 95 and 101 are connected so that when transistor 82 conducts, transistors 95 and 101 are cut off. This action is shown by line d on FIG. 2. Similarly, transistors 96 and 102 are connected so that when transistor 83 is conducting, transistors 96 and 102 are cut off. This is shown by line e of FIG. 2.

The transformers 105 and 106 are connected to transistor 101 and pulses are produced therein when the transistor 101 starts and stops conducting. The secondary windings 105b and 106b are poled so that a positive pulse is developed in winding 105b when the transistor 101 starts to conduct (line f) and a positive pulse is developed in the winding 106b when the transistor 101 ceases to conduct (line g). Similarly, the windings 107b and 108b of the transformers 107 and 108 which are connected to transistor 102 are connected so that a positive pulse is produced in winding 107b when the transistor 102 starts to conduct (line h) and a positive pulse is provided in winding 108b when the transistor 102 ceases to conduct (line i).

As previously stated, the transformers control the conduction of rectifiers and these are rectifiers 111, 112, 113 and 114 connected in a bridge circuit. The rectifiers may be silicon controlled rectifiers which have a control electrode for rendering the rectifier conducting in response to a positive pulse applied thereto. Alternating current is applied from transformer 115 to the terminals E and F of the bridge. This current is applied through the bridge to the terminals G and H to energize the motor 15 as will be explained. It will be seen that the winding 105b is connected to the rectifier 111 so that when a positive pulse is produced in the winding 105b, the rectifier 111 will be rendered conducting. If the alternating current from the transformer 115 is of the right polarity when the rectifier 111 is conducting, current will be passed from terminal F to terminal G and applied to the motor 15. Similarly, the rectifier 113 is connected to the winding 106b, the rectifier 112 is connected to the winding 107b and the rectifier 114 is connected to the winding 108b. Accordingly, the rectifiers will be rendered conducting at the time that the transformers connected thereto apply positive pulses thereto, so that the rectifiers are conducting, as shown by lines j, k, l and m in FIG. 2, at the time that positive pulses are developed in the transformers, as shown by the lines f, g, h and i.

When rectifier 112 conducts, current of one polarity from terminal 116 of transformer 115 is applied through contacts 117 from point E to point G of the bridge and to terminal 118 connected through inductor 119 to the motor 15. Resistor 120 is bridged across inductor 119. Contacts 117 and contacts 122 may be provided on a relay for de-energizing motor 15. This would provide a complete circuit from transformer 115 to the motor which is connected to the center tap of the secondary winding of transformer 115. When rectifier 113 conducts, current is applied from the terminal 121 of the transformer 115 through contacts 122 and from point F to point H of the bridge to terminal 123 which is connected by inductor 124 to the motor 15. Resistor 125 bridges inductor 124. At any instant the current at terminal 121 of transformer 115 is of opposite polarity to that at terminal 116. It is therefore seen that when the rectifiers 112 and 113 conduct at the same time, opposite polarity currents are applied from terminals 116 and 121 to the terminals 118 and 123 and across inductors 119 and 124. Since the motor 15 is connected to the junction between inductors 119 and 124, no current would be applied to the motor since the out of phase currents would neutralize each other. Similarly, rectifier 111 when conducting applies current from terminal 121 to terminal 118 and rectifier 114 when conducting applies current of opposite polarity from terminal 116 to terminal 123.

Curve n in FIG. 2 shows the voltage applied to the silicon controlled rectifiers. With the silicon controlled rectifiers pulsed as shown in lines j, k, l, and m, there can be no motor current as the rectifiers 111 and 114 are conducting at the same time and the rectifiers 112 and 113 are conducting at the same time. Curve o shows the application of current to motor 15, and the vertical lines at the peaks of the voltage waves represent a "no current" condition.

Figure 3:
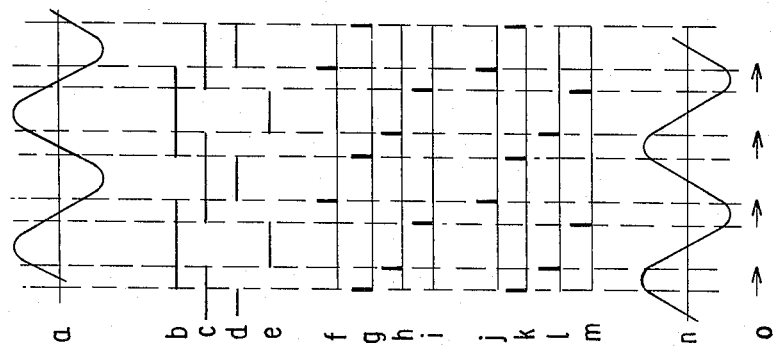

Considering now the condition in the system that there is an error voltage, this may be caused by a change in the load which causes the motor to change speed, or by a change in the reference voltage to produce a change in motor speed. The error voltage operates through the servo system and the proportional amplifier so that the output stage 69 of the amplifier 60 draws more current than at the "at rest" position. This current is applied to the transistors 82 and 83 of the phase shift circuit. In such case the transistors 82 and 83 will conduct more than half the time and will be conducting simultaneously during part of the cycle. This action is shown in FIG. 3 by the lines $b$ and $c$. Inasmuch as transistor 82 when conducting cuts off transistors 95 and 101, these transistors will be conducting less than half the cycle. Similarly, transistors 96 and 102 which are cut off by transistor 83 will be conducting less than half a cycle. Now the points at which the transformer secondary windings 105$b$, 106$b$, 107$b$ and 108$b$ are pulsed positively are shifted and will appear as shown by lines $f$, $g$, $h$ and $i$ of FIG. 3. Similarly, the time when the silicon controlled rectifiers are rendered conducting will shift as shown by lines $j$, $k$, $l$, and $m$ of FIG. 3. Now, rectifier 113 will be conducting prior to the time that rectifier 112 is conducting so that current will be applied through rectifier 113 to the motor 115. Similarly, rectifier 114 will be conducting prior to the time rectifier 111 is conducting so that current will be applied through rectifier 114 to the motor during the alternate half cycle. These periods during which current is supplied to the motor are shown by line $o$ in FIG. 3.

A similar situation occurs when the error voltage is of the opposite polarity and the output transistor 69 of amplifier 60 draws less current than in the "at rest" position. This is illustrated in FIG. 4. In such case, the transistors 82 and 83 are conducting less than half of each cycle. Accordingly, transistors 95 and 101 which are cut off when transistor 82 conducts are conducting more than half the cycle, and transistors 96 and 102 which are conducting when transistor 83 is cut off are conducting more than half the cycle. Thus causes the time during which positive pulses appear in the transformer winding 105$b$, 106$b$, 107$b$ and 108$b$ to be shifted in the opposite directions and the silicon controlled rectifiers to be rendered conducting at different times as shown in FIG. 4. In this condition it will be seen that rectifier 112 is rendered conducting prior to rectifier 113 so that current flows through rectifier 112 to the motor 15 until rectifier 113 conducts. This current is, of course, of opposite polarity to the current flowing through rectifier 113, so that current is supplied to the motor 15 in the opposite direction to cause rotation in the opposite direction as compared to the operation shown in FIG. 3. Similarly, rectifier 111 is rendered conducting prior to rectifier 114 to supply current during the alternate half cycles which causes rotation of the motor 15 in such opposite direction.

The motor control circuit may be used in many different applications, such as in applications wherein the load of the motor changes, and this causes a change in the motor speed. In such case the system will correct for the change in speed resulting from the change in load. This system may also be used in applications wherein it is desired to change the speed at different times as in accordance with a predetermined program. In such case the movable contact 13 of potentiometer 12 may be moved or some other reference voltage source may be used which furnishes a voltage corresponding to the desired speed. In such case the control system will energize the motor as required to provide the desired speed.

In either of the above cases, the change in speed is represented by the error voltage which is produced by the series addition of the reference voltage and the voltage from tachometer 14 coupled to the motor 15. This voltage is applied through the equalizer network to the amplifier 60 to change the level of conduction therein, which provides current to the phase shift circuit 80 to control the supply of current to the motor 15 to correct its speed. This correction will operate relatively fast but if adjusted to provide complete correction, will necessarily overshoot to cause a hunting action. It is therefore preferable to adjust the fast correction so that it only partially corrects for the desired change in speed. To provide complete correction, the error voltage is also applied through the servo system 20 which produces a control voltage at potentiometer 61. This control voltage operates through amplifier 60 and phase shift circuit 80 to further control the current applied to the motor. This is a slow acting control which can be adjusted to completely remove any error in the speed. This control may also compensate for any errors in the other components of the system, such as in the amplifier 60 or phase shift circuit 80.

Figure 5:
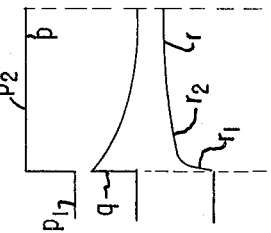
FIG. 5 shows the cooperation of the servo motor control and the proportional control.

In FIG. 5 the operation of the system is illustrated with curve $p$ representing the speed. This represents the condition that the motor is operating at speed $p_1$, shown at the left of the line and then the speed is changed to that represented by $p_2$. This change in the desired speed will produce an error voltage represented by the line $q$. It is noted that this voltage rises sharply as the desired speed $p_2$ differs from the initial speed $p_1$. Line $r$ represents the actual speed of the motor. The error voltage $q$, operating directly through the amplifier 60 and phase shift circuit 80 will cause the rectifiers to supply increased current to the motor to increase its speed rapidly in the region marked $r_1$. Then the motor speed will gradually increase in the region $r_2$ through action of the servo system and the control voltage which is produced thereby. The increase in speed of the motor will cause the motor to assume its desired speed and the error voltage will be reduced to zero.

In FIG. 7 there is illustrated a circuit which can be used to replace the servo motor 54 and potentiometer 59 operated thereby, in the system of FIG. 1. The circuit is energized by the two transistors 40 and 41 which may have their input circuits connected in exactly the same way as shown in FIG. 1. The collector electrodes of transistors 40 and 41 are connected to the winding 130 of a chopper having a vibrating contact 131. Negative potential is applied to the collector electrodes of transistors 40 and 41 through resistors 132 and 133 respectively. When there is no error voltage, and no output from the transistors, current is applied from the negative source through resistor 133 and bleeder resistor 134 so that a voltage is developed across resistor 133. This voltage is applied to the coil 130 of the chopper and acts to hold the contact 131 open. The alternating current output of the transistors must overcome this bias voltage to cause the contact 131 to close so that the chopper operates only when the alternating current output of transistors 40 and 41 exceed a predetermined value.

The contact 131 operates to apply a voltage from the secondary winding of transformer 135 through resistor 136 to the grid of tube 137. The transformer 137 is coupled to the alternating current source and therefore provides an alternating voltage of the same frequency as that applied to the winding 130 of the chopper. As previously stated, the output wave from transistors 40 and 41 may reverse in phase, depending upon the polarity of the error voltage. This is shown in FIG. 8 wherein solid wave $s$ and dotted wave $t$ are of opposite phases. The voltage in the secondary of transformer 135 is of fixed polarity as shown by curve $u$ in FIG. 8. Assuming that the chopper is constructed so that the contact 131 closes during positive half cycles of the output wave of the transistors 40 and 41 then when the output wave has the phase shown by curve $s$, the contact 131 will apply positive half cycles of the curve $u$ from the transformer secondary 135 through resistor 136 to the grid of tube 137. When the error voltage is of the opposite polarity and the output of the transistors 40 and 41 is as represented by the dotted curve $t$, the negative half cycles of the wave $u$ will be applied through contact 131 and resistor 136 to the grid of tube 137.

The tube 137 is of the type which draws negligible grid current and operates at low plate voltage. A tube, commonly available as type CK-5886, manufactured by Raytheon Manufacturing Co., is suitable for this purpose. The plate of the tube 137 is connected to the base of transistor 138, and the emitter of transistor 138 is connected to the base of transistor 139. Transistors 138 and 139 therefore are coupled in cascade between the tube 137 and resistor 140 which forms the load. Bias resistor 141 serves to establish the potential of the emitter of transistor 138 and the base of transistor 139. Transistors 138 and 139 make it possible to use a low impedance load and at the same time present a high impedance to the plate of tube 137. The voltage across resistor 140 is applied to the base of transistor 143, the emitter of which is connected to load resistor 145.

Capacitor 142 is connected from load resistor 140 to the grid of tube 137 to provide feedback for holding the grid near the cathode potential so that the circuit forms an operational amplifier. When a positive voltage is applied to the grid of this tube, it will tend to conduct more and the plate voltage will tend to drop. This action will be counteracted by the capacitor which tends to lower the grid potential. When a negative voltage is applied to the grid of tube 137, the tube tends to conduct less and the plate voltage will tend to rise. Again this is reflected back to the grid through capacitor 142. This action is similar to that of the integrating operational amplifier in which linearly increasing or decreasing output corresponds to a constant input (respectively negative or positive). However, due to the practically infinite grid resistance of tube 137, any output will be held almost indefinitely at the time the input voltage is returned to zero.

The voltage across resistor 140 will therefore increase or decrease in steps during half cycles of the alternating current wave, when there is an error voltage in the system and the chopper operates to apply a voltage to the amplifier 137. This change in steps is in small increments, and the effect is that of a continuous change. The transistors 138, 139 and 143 effectively couple the tube 137, which requires a high impedance load, to a low impedance provided by resistor 145. The voltage across resistor 145 is equivalent to the voltage produced at the moveable arm 59 of the potentiometer and may be applied through resistor 62 to the transistor 63 in the system of FIG. 1.

Although the system has been described for controlling the speed of a motor, it is obvious that this control system can be used in many other applications where a desired movement is required, and wherein the movement can produce a signal which can be compared with a reference signal to establish the error signal which is applied to the correction system. The system provides a fast and smooth correction and completely removes any error to thereby provide complete correction of the device controlled through the supply of power thereto.

I claim:

1. A control system for applying power to a device including in combination, reference means for providing a reference voltage, means for producing a voltage corresponding to the movement of the device controlled, means for comparing the reference voltage and the produced voltage to provide an error voltage, ring modulator means for converting the error voltage into an alternating current signal, amplifier means for amplifying the alternating current signal, potentiometer means having a movable arm for providing a direct current control potential, servo means connected to said movable arm for moving the same, means for applying the signal from said amplifier means to said servo means to vary said control potential in accordance with said error voltage, rectifier means for supplying current to the controlled device, control circuit means including balanced branches for applying pulses to said rectifier means to control the current supplied thereby to the device, and means applying said error voltage and said control potential to said control circuit means for controlling the pulses applied to said rectifier means.

2. A control system for applying direct current power to a device including in combination, reference means for providing a reference voltage, means for producing a voltage corresponding to the movement of the device controlled, means for comparing the reference voltage and the produced voltage to provide an error voltage, means for converting the error voltage into the alternating current signal which varies in amplitude with the error voltage and reverses in phase with change in polarity of the error voltage, amplifier means for amplifying the alternating current signal, servo means responsive to said signal for providing a direct current control potential which varies from a center position as the error voltage varies from zero, rectifier means for supplying current to the controlled device, control circuit means including balanced branches for applying pulses to said rectifier means to control the current supplied thereby to the device, and means applying said error voltage and said control potential to said control circuit means for controlling the pulses applied to said rectifier means.

3. A control system for applying direct current power to a controlled device including in combination, reference means for providing a reference voltage, means for producing a voltage corresponding to the movement of the controlled device, means for comparing the reference voltage and the produced voltage to provide an error voltage, means for converting the error voltage into an alternating current signal, servo means responsive to the alternating current signal for providing a direct current control potential which varies in accordance with said error voltage, rectifier means for supplying current to the controlled device, control circuit means including balanced phase shift branches for supplying pulses to said rectifier means to control the current supplied to the device, equalizer means for applying said error voltage to said control circuit means, and means applying said control potential to said control circuit means, whereby the pulses applied to said rectifier means vary with said error voltage and with said control potential.

4. A control system for applying direct current power to a motor to control the speed thereof, said system including in combination, reference means for providing a reference voltage, tachometer means coupled to the motor for producing a voltage corresponding to the speed thereof, means for comparing the reference voltage and the tachometer voltage to provide an error voltage, ring modulator means for converting the error voltage into an alternating current signal, amplifier means for amplifying the alternating current signal, potentiometer means having a movable arm for providing a direct current control potential, servo means connected to said movable arm for moving the same, means for applying the signal from said amplifier means to said servo means to vary said control potential in accordance with said error voltage, rectifier means for supplying current to the motor, control circuit means including balanced phase shift branches for applying pulses to said rectifier means to control the current supplied thereby to the motor, equalizer means for applying said error voltage to said control circuit means, and means applying said control potential to said control circuit means, whereby the pulses applied to said rectifier means vary with said error voltage and with said control potential to control the motor speed to eliminate the error signal.

5. A control system for applying direct current power to a controlled device including in combination, reference means for providing a reference voltage, means for producing a voltage corresponding to the movement of the controlled device, means for comparing the reference voltage and the produced voltage to provide an error voltage, means for converting the error voltage into an alternating current signal, servo means responsive to the alternating current signal for providing a direct current control potential which varies in accordance with said error voltage, rectifier means for supplying direct current to the controlled device, control circuit means for said rectifier means including amplifier means and phase shift means, said phase shift means including a pair of branches for applying pulses to said rectifier means to control the conduction thereof and the current supplied thereby to the device, means applying alternating current to said branches for causing the same to conduct during the alternate half cycles, with each branch producing a pulse at the initiation and the termination of conduction therein, means for applying said error voltage and said control potential to said amplifier means, said amplifier means applying direct current to said branches in accordance with said error voltage and said control potential for alternating the portion of each cycle during which each branch is conducting to thereby vary the spacing of said pulses, whereby the pulses applied to said rectifier means vary with said error voltage and with said control potential to vary the periods of conduction of said rectifier means and thereby control the direct current power applied to said controlled device.

6. A control system for applying direct current power to a controlled device including in combination, reference means for providing a reference voltage, means for producing a voltage corresponding to the movement of the device, means for comprising the reference voltage and the produced voltage to provide an error voltage, ring modulator means for converting the error voltage into an alternating current signal, means for amplifying the alternating current signal, potentiometer means having a movable arm for providing a direct current control potential, servo means connected to said movable arm for moving the same, means for applying the alternating current signal to said servo means to vary said control potential in accordance with said error voltage, rectifier means for supplying current to the controlled device, control circuit means for said rectifier means including amplifier means and phase shift means, said phase shift means including a pair of balanced branches for applying pulses to said rectifier means to control the current supplied to the device, means applying alternating current to said branches for causing the same to conduct during the alternate half cycles of the alternating current, with each branch producing a pulse at the initiation and the termination of conduction therein, equalizer means for said branches in accordance with said error voltage and means applying said control potential to said amplifier means, said amplifier means applying direct current to said branches in accordance with said error voltage and said control potential for altering the portion of each cycle during which each branch is conducting to thereby vary the spacing of said pulses, whereby the pulses applied to said rectifier means vary with said error voltage and with said control potential.

7. A control system for applying direct current power to a controlled device including in combination, reference means for providing a reference voltage, means for producing a voltage corresponding to the movement of the controlled device, means for comparing the reference voltage and the produced voltage to provide an error voltage, means for converting the error voltage into an alternating current signal, servo means responsive to said altenating current signal for providing a direct current control potential which varies in accordance with said error voltage, rectifier means for connecting the controlled device to an alternating current source for supplying direct curent to the controlled device, said rectifier means including four silicon controlled rectifiers connected in a bridge circuit, control circuit means including amplifier means and phase shift means, said phase shift means including a pair of balanced branches each having first and second windings each being connected to one of said silicon controlled rectifiers for applying pulses thereto to control the current supplied thereby to the controlled device, means applying alternating current to said branches for causing the same to conduct during alternate half cycles of the applied alternating current, with each branch producing a pulse in said first winding thereof at the initiation of conduction and producing a pulse in said second winding thereof at the termination of conduction, means for applying said error voltage and said control potential to said amplifier means, said amplifier means applying direct current to said branches in accordance with said error voltage and said control potential for altering the portion of each cycle during which each branch is conducting to thereby vary the spacing of said pulses, whereby the spacing of said pulses applied to said rectifier means vary with said error voltage and said control potential to control the periods of conduction of said rectifiers and thereby control the direct current power applied to the controlled device.

8. A control system for applying direct current power to a motor to control the speed thereof, said system including in combination, reference means for providing a reference voltage, tachometer means coupled to the motor for producing a voltage corresponding to the speed thereof, means for comparing the reference voltage and the tachometer voltage to provide an error voltage, means for converting the error voltage into an alternating current signal, servo means responsive to the alternating current signal for providing a direct current control potential which varies with said error voltage, rectifier means for connecting the motor to an alternating current source for supplying direct current thereto, said rectifier means including four silicon controlled rectifiers connected in a bridge circuit, each of said rectifiers having a control electrode, control circuit means including amplifier means and phase shift means, said phase shift means including a pair of balanced branches each having first and second windings each being connected to one of said control electrodes of said silicon controlled rectifiers for applying positive pulses thereto, to selectively render the same conductive, means applying alternating current to said branches for causing the same to conduct during alternate half cycles, with each branch producing a pulse in said first winding thereof at the initiation of conduction and producing a pulse in said second winding thereof at the termination of conduction, means for applying said error voltage and said control potential to said amplifier means, said amplifier means applying direct current to said branches in accordance with said error voltage and said control potential for altering the portion of each cycle during which each branch is conducting to thereby vary the spacing of said pulses, whereby the spacing of said pulses applied to said rectifier means vary with said error voltage and with said control potential to control the periods of conduction of said rectifiers and thereby control the direct current power applied to the motor.

9. A control system for applying direct current power to a motor to control the speed thereof, said system including in combination, reference means for providing a reference voltage, tachometer means coupled to the motor for producing a voltage corresponding to the speed thereof, means for comparing the reference voltage and the tachometer voltage to provide an error voltage, modulator means for converting the error voltage into an alternating current signal, means for amplifying the alternating current signal, potentiometer means having a movable arm for providing a direct current control potential, servo means connected to said movable arm for moving the same, means for applying the alternating current signal to said servo means to vary said control potential in accordance with said error voltage, rectifier means for connecting the controlled device to an alternating current source for supplying direct current to the motor, said rectifier means including four silicon controlled rectifiers connected in a bridge circuit, each of said rectifiers having a control electrode, control circuit means including amplifier means and phase shift means, said phase shift means including a pair of balanced branches each having first and second windings for applying positive pulses to said control electrodes of said silicon controlled rectifiers to selectively render the same conductive, means applying alternating current to said branches for causing the same to conduct during alternate half cycles, with each branch producing a pulse in said first winding thereof at the initiation of conduction and producing a pulse in said second winding thereof at the termination of conduction, means for applying said error voltage and said control potential to said amplifier means, said amplifier means applying direct current to said branches in accordance with said error voltage and said control potential for altering the portion of each cycle during which each branch is conducting to thereby vary the spacing of said pulses, whereby the spacing of said pulses applied to said rectifier means vary with said error voltage and with said control potential to control the periods of conduction of said rectifiers and thereby control the direct current power applied to the motor.

10. A control system for applying direct current power to a motor to control the speed thereof, said system including, in combination, reference means for providing a reference voltage, tachometer means coupled to the motor for producing a voltage corresponding to the speed thereof, means for comparing the reference voltage and the tachometer voltage to provide an error voltage, modulator means for converting the error voltage into an alternating current signal, push-pull transistor amplifier means for amplifying the alternating current signal, potentiometer means having a movable arm for providing a direct current control potential, servo means connected to said movable arm for moving the same, means for applying the alternating current signal from said amplifier means to said servo means to vary said control potential in accordance with said error voltage, rectifier means for connecting the controlled device to an alternating current source for supplying direct current to the motor, said rectifier means including four silicon controlled rectifiers connected in a bridge circuit, each of said rectifiers having a control electrode, control circuit means including second transistor amplifier means and phase shift means, said phase shift means including a pair of balanced branches each having first and second windings for producing positive pulses, said windings being individually coupled to said control electrodes of said silicon controlled rectifiers for applying pulses thereto to selectively render the same conductive, means applying alternating current to said branches for causing the same to conduct during alternate half cycles, with each branch producing a pulse in said first winding thereof at the initiation of conduction and producing a pulse in said second winding thereof at the termination of conduction, means for applying said error voltage and said control potential to said amplifier means, said amplifier means being normally conductive and conducting more or less in response to said error voltage and said control potential for altering the portion of each cycle during which each branch is conducting to thereby vary the spacing of said pulses, whereby the spacing of said pulses applied to said rectifier means vary with said error voltage and with said control potential to control the periods of conduction of said rectifiers and thereby control the direct current power applied to the motor.

11. A control system for applying direct current power to a controlled device including, in combination, reference means for providing a reference voltage, means for producing a voltage corresponding to the movement of the controlled device, means for comparing the reference voltage and the produced voltage to provide an error voltage, means for converting the error voltage into an alternating current signal, servo means responsive to said alternating current signal for providing a direct current control potential which varies in accordance with said error voltage, rectifier means for connecting the controlled device to an alternating current source for supplying direct current to the controlled device, said rectifier means including four silicon controlled rectifiers connected in a bridge circuit, control circuit means including amplifier means and phase shift means, said phase shift means including a pair of balanced branches each having first and second windings each being connected to one of said silicon controlled rectifiers for applying pulses thereto to control the current supplied thereby to the controlled device, means applying alternating current to said branches for causing the same to conduct during alternate half cycles of the applied alternating current, with each branch producing a pulse in said first winding thereof at the initiation of conduction and producing a pulse in said second winding thereof at the termination of conduction, means for applying said error voltage and said control potential to said amplifier means, said amplifier means including a plurality of transistors normally conducting with the conductivity varying with said error voltage and said control potential applied thereto, said amplifier means applying direct current to said branches in accordance with said error voltage and said control potential for altering the portion of each cycle during which each branch is conducting to thereby vary the spacing of said pulses, whereby the spacing of said pulses applied to said rectifiers varies with said error voltage and said control potential to control the periods of conduction of said rectifiers and thereby control the direct current power applied to the controlled device.

12. A control system for applying direct current power to a controlled device including, in combination, rectifier means for connecting the controlled device to an alternating current source for supplying direct current to the controlled device, said rectifier means including four silicon controlled rectifiers connected in a bridge circuit, control circuit means including amplifier means and phase shift means, said phase shift means including a pair of balanced branches each having first and second windings each coupled to one of said silicon controlled rectifiers for applying pulses thereto to control the current supplied thereby to the controlled device, means applying alternating current to said branches for causing the same to conduct during alternate half cycles, with each branch producing a pulse in said first winding thereof at the initiation of conducting and producing a pulse in said second winding thereof at the termination of conduction, and control means for applying a control potential to said amplifier means, said amplifier means applying direct current to said branches in accordance with said control potential for altering the portion of each cycle during which each branch is conducting to thereby vary the spacing of said pulses, whereby the spacing of said pulses applied to said rectifier means vary with said control potential to control the conductivity of said rectifiers and thereby control the direct current power applied to the controlled device.

13. A control system for applying direct current power to a controlled device including in combination, rectifier means for connecting the controlled device to an alternating current source for supplying direct current to the controlled device, said rectifier means including four silicon controlled rectifiers connected in a bridge circuit and each including a control electrode, control circuit means including amplifier means and phase shift means, said phase shift means including a pair of balanced branches each having first and second windings each being coupled to said control electrode of one of said silicon controlled rectifiers for applying pulses thereto to control the current supplied thereby to the controlled device, means applying alternating current to said branches for causing the same to conduct during alternate half cycles, with each branch producing a pulse in said first winding thereof at the initiation of conducting and producing a pulse in said second winding thereof at the termination of conduction, and control means for applying a control potential to said amplifier means, said amplifier means including at least one transistor which is conductive and which conducts more or less in accordance with said control potential, said amplifier means applying direct current to said branches for altering the portion of each cycle during which each branch is conducting to thereby vary the spacing of said pulses, whereby the spacing of said pulses applied to said rectifier means vary with said control potential to control the conductivity of said rectifiers and thereby control the direct current power applied to the controlled device.

14. A control system including in combination, means for producing a control voltage, modulator means for converting a direct current voltage into an alternating current signal, means coupled to said modulator means for amplifying the alternating current signal, servo means responsive to the alternating current signal for providing a direct current control potential which varies in accordance with the alternating current signal, amplifier means coupled to said servo means and being normally conducting with the conductivity thereof varying in accordance with said control potential, means coupled to said amplifier means for producing a reference potential, switch means selectively connecting said control voltage and said reference potential to said modulator means, said reference potential when applied to said modulator means operating through said servo means to hold said amplifier means at its normal conducting level, said control voltage when applied to said modulator means operating through said servo means to control the conductivity of said amplifier means.

15. A control system for applying direct current power to a controlled device including in combination, reference means for providing a reference voltage, means for producing a voltage corresponding to the movement of the device controlled, means for comparing the reference voltage and the produced voltage to provide an error voltage, modulator means for converting a direct current voltage into an alternating current signal, means coupled to said modulator means for amplifying the alternating current signal, servo means responsive to the alternating current signal for providing a direct current control potential which varies in accordance with the alternating current signal, amplifier means coupled to said servo means and being normally conducting with the conductivity thereof varying in accordance with said control potential, means coupled to said amplifier means for producing a reference potential, switch means selectively connecting said error voltage and said reference potential to said modulator means, said reference potential when connected to said modulator means operating through said modulator means and said servo means to hold said amplifier means at its normal conducting level, rectifier means for supplying current to the controlled device, and phase shift means for applying pulses to said rectifier means to control the current supplied to the device, said amplifier means applying current to said phase shift means to control the pulses therefrom to thereby control the conduction of said rectifier means and the current supplied thereby to the controlled device.

16. A control system for applying direct current power to a motor to control the speed thereof, said system including in combination, reference means for providing a reference voltage, tachometer means coupled to the motor for producing a voltage corresponding to the speed thereof, means for comparing the reference voltage and the tachometer voltage to provide an error voltage, modulator means for converting a direct current voltage into an alternating current signal, push-pull transistor amplifier means coupled to said modulator means for amplifying the alternating current signal, potentiometer means having a movable arm for providing a direct current control potential, servo means connected to said movable arm for moving the same, means for applying the alternating current signal from said amplifier means to said servo means to vary said control potential in accordance with said error voltage, second amplifier means coupled to said movable arm of said potentiometer and being normally conductive, means for applying said error voltage and said control potential to said second amplifier means, the conductivity of said second amplifier means varying with said error voltage and said control potential, said second amplifier means including means for providing a reference potential which varies with the conductivity of said second amplifier means, switch means for selectively applying said error voltage and said reference potential to said modulator means, rectifier means for connecting the controlled device to an alternating current source for supplying direct current to the motor, said rectifier means including four silicon controlled rectifiers connected in a bridge circuit, each of said rectifiers having a control electrode, phase shift means including a pair of balanced branches each having first and second windings for producing positive pulses, said windings being individually coupled to said control electrodes of said silicon controlled rectifiers for applying pulses thereto to selectively render the same conductive, means applying alternating current to said branches for causing the same to conduct during alternate half cycles, with each branch producing a pulse in said first winding thereof at the initiation of conduction and producing a pulse in said second winding thereof at the termination of conduction, means coupling said amplifier means to said phase shift means for applying current to said branches from said amplifier means for altering the portion of each cycle during which each branch is conducting to thereby vary the spacing of said pulses, whereby the spacing of said pulses applied to said rectifier means varies with said error voltage and with said control potential to control the periods of conduction of said rectifiers and thereby control the direct current power applied to the motor.

17. A control system for applying direct current power to a device including in combination, reference means for providing a reference voltage, means for producing a voltage corresponding to the movement of the device controlled, means for comparing the reference voltage and the produced voltage to provide an error voltage, means for converting the error voltage into an alternating current signal which varies in amplitude with the error voltage and which reverses in phase with change in polarity of the error voltage, servo means responsive to said signal including amplifier means having a load across which a direct current control potential is developed which varies from a center value as the error voltage varies from zero, means controlled by said signal for applying an operating voltage to said amplifier means when said signal reaches a predetermined value, with the polarity of said operating voltage depending upon the phase of said signal, said amplifier including feedback means tending to counteract said operating voltage for holding said amplifier at a fixed operating position whereby the control potential across said load changes in increments, rectifier means for supplying current to the controlled device, control circuit means including balanced branches for applying pulses to said rectifier means to control the current supplied thereby to the device, and means applying said error voltage and said control potential to said control circuit means for controlling the pulses applied to said rectifier means.

18. A control system for applying direct current power to a device including in combination, reference means for providing a reference voltage, means for producing a voltage corresponding to the movement of the device controlled, means for comparing the reference voltage and the produced voltage to provide an error voltage, means for converting the error voltage into an alternating current signal which varies in amplitude with the error voltage and which reverses in phase with change in polarity of the error voltage, servo means responsive to said signal including amplifier means including an electron valve having a high impedance grid and a plate, a load circuit including a resistor coupled to the plate of said valve, and a feedback capacitor coupled from said resistor to said grid, means controlled by said alternating current signal for applying an operating voltage to said grid during a portion of each cycle of said signal when said signal reaches a predetermined value, with the polarity of said operating voltage depending upon the phase of said signal, whereby a control potential is developed across said resistor which varies from a center value as the error voltage varies from zero, said feedback capacitor tending to counteract said operating voltage for holding said amplifier at a fixed operating point whereby the control potential across said load changes in increments, rectifier means for supplying current to the controlled device, control circuit means for applying pulses to said rectifier means to control the current supplied thereby to the device, and means applying said error voltage and said control potential to said control circuit means for controlling the pulses applied to said rectifier means.

19. A control system for applying direct current power to a device including in combination, reference means for providing a reference voltage, means for producing a voltage corresponding to the movement of the device controlled, means for comparing the reference voltage and the produced voltage to provide an error voltage, means for converting the error voltage into an alternating current signal which varies in amplitude with the error voltage and which reverses in phase with change in polarity of the error voltage, means responsive to said signal including amplifier means having an electron valve with a high impedance grid and a plate adapted to be coupled to a high impedance load, a load circuit including a load resistor and first and second transistors connected in cascade in the order named between said plate and said resistor, said transistors transforming the impedance of said resistor to a higher impedance at said plate, and a feedback capacitor coupled from the function between said second transistor and said resistor to said grid, means controlled by said alternating current signal for applying an operating voltage to said grid during a portion of each cycle of said signal when said signal reaches a predetermined value, with the polarity of said operating voltage depending upon the phase of said signal, said feedback capacitor tending to counteract said operating voltage for holding said amplifier at a fixed operating point, whereby a control potential is developed across said resistor which varies from a center value in increments as the error voltage varies from zero, a bridge rectifier circuit including rectifier devices for supplying current to the controlled device, control circuit means including balanced phase shift branches for applying pulses to said rectifier devices at controlled intervals to control the current supplied thereby to the device, means applying alternating current to said branches for causing each branch to conduct during alternate half cycles, with said branches producing pulses at the initiation and termination of such conduction, means for applying current to said control circuit means for controlling the portion of each cycle during which each branch conducts, and means responsive to said error voltage and said control potential for controlling the current applied to said control circuit means.

20. A control system for providing a direct current potential which varies about a center value in response to an alternating current signal which varies in amplitude and which reverses in phase, said system including in combination, amplifier means having an electron valve with a high impedance grid and a plate adapted to be coupled to a high impedance, a load circuit including a load resistor and first and second transistors connected in cascade in the order named between said plate and said resistor, said transistors transforming the impedance of said resistor to a higher impedance at said plate, and a feedback capacitor coupled from the junction between said second transistor and said resistor to said grid, means controlled by the alternating current signal for applying an operating voltage to said grid during a portion of each cycle of said signal when said signal reaches a predetermined value, with the polarity of said operating voltage depending upon the phase of said signal, said feedback capacitor tending to counteract said operating voltage for holding said amplifier at a fixed operating point, whereby a control potential is developed across said resistor which changes in increments, to produce variations from a center value.

References Cited by the Examiner

UNITED STATES PATENTS

| 2,839,717 | 6/1958 | Mandelkehr et al. | 323—22 |
| 2,967,270 | 1/1961 | Drenning | 318—317 |
| 2,997,643 | 8/1961 | Schlansker et al. | 323—22 |
| 3,007,099 | 10/1961 | Greening et al. | 318—317 |
| 3,079,539 | 2/1963 | Guerth | 318—327 |

ORIS L. RADER, *Primary Examiner.*